US012167221B2

(12) United States Patent
Par

(10) Patent No.: US 12,167,221 B2
(45) Date of Patent: Dec. 10, 2024

(54) INVARIANCE-CONTROLLED ELECTROACOUSTIC TRANSMITTER

(71) Applicant: Clemens Par, Abcoude (NL)

(72) Inventor: Clemens Par, Abcoude (NL)

(73) Assignee: Clemens PAR, Abcoude (NL)

( * ) Notice: Subject to any disclaimer, the term of this patent is extended or adjusted under 35 U.S.C. 154(b) by 247 days.

(21) Appl. No.: 18/011,434

(22) PCT Filed: Jun. 3, 2021

(86) PCT No.: PCT/EP2021/000069

§ 371 (c)(1),
(2) Date: Dec. 19, 2022

(87) PCT Pub. No.: WO2022/008092

PCT Pub. Date: Jan. 13, 2022

(65) Prior Publication Data

US 2023/0247381 A1 Aug. 3, 2023

(30) Foreign Application Priority Data

Jul. 6, 2020 (EP) .................................... 20075008

(51) Int. Cl.
*H04S 7/00* (2006.01)
*H04S 3/00* (2006.01)

(52) U.S. Cl.
CPC ................ *H04S 7/30* (2013.01); *H04S 3/008* (2013.01); *H04S 2420/01* (2013.01)

(58) Field of Classification Search
None
See application file for complete search history.

(56) References Cited

U.S. PATENT DOCUMENTS

| | | | | |
|---|---|---|---|---|
| 6,118,876 A * | 9/2000 | Ruzicka | H04R 5/04 | 381/27 |
| 7,382,885 B1 * | 6/2008 | Kim | H04S 7/30 | 381/23 |
| 2010/0232609 A1 * | 9/2010 | Sungyoung | H04S 3/02 | 381/1 |
| 2017/0070838 A1 * | 3/2017 | Helwani | H04S 5/005 | |
| 2020/0059750 A1 * | 2/2020 | Haurais | H04S 7/303 | |

FOREIGN PATENT DOCUMENTS

| | | |
|---|---|---|
| WO | 2009138205 A1 | 11/2009 |
| WO | 2011009649 A1 | 1/2011 |
| WO | 2011009650 A1 | 1/2011 |

(Continued)

OTHER PUBLICATIONS

International Search Report from corresponding International Application No. PCT/EP2021/000069, mailed on Sep. 21, 2021, 6 pages including translation.

(Continued)

*Primary Examiner* — Harry S Hong
(74) *Attorney, Agent, or Firm* — Tucker Ellis LLP

(57) ABSTRACT

Determining Par-Hilbert invariants is a reliable auxiliary means in the field of real-time transmission of spatial audio signals. So-called CC-HRTFs make way for an inverse and stable model of spatial perception both on headphones and on loudspeakers, with precise localization in the three-dimensional space.

20 Claims, 11 Drawing Sheets

Sound localization with artificial head (Manikin)

(56) References Cited

FOREIGN PATENT DOCUMENTS

| | | | |
|---|---|---|---|
| WO | 2012016992 | A2 | 2/2012 |
| WO | 2012032178 | A1 | 3/2012 |
| WO | 2014072513 | A1 | 5/2014 |
| WO | 2015049334 | A1 | 10/2014 |
| WO | 2015049332 | A1 | 4/2015 |
| WO | 2015128376 | A1 | 9/2015 |
| WO | 2015128379 | A1 | 9/2015 |
| WO | 2015173422 | A1 | 11/2015 |
| WO | 2016030545 | A2 | 3/2016 |

OTHER PUBLICATIONS

Ahmad, Junaid Jameel at al., ECMA-407: New Approaches to 3D Audio Content Data Rate Reduction with RVC-CAL, Audio Engineering Society Convention paper 9218, Oct. 9-12, 2014, 12 pages.
Par, Clemens, "My Indian elephant ride", Technologies and Systems, FCT, Nov. 2016, 14 pages with translation.
Par, Clemens, "Small is beautiful. The Par Hilbert invariants as a paradigm of the broadcasting world", Technologies and Systems, FCT, Nov. 2016, 6 pages with translation.
International Preliminary Report on Patentability from corresponding International Application No. PCT/EP2021/000069, Jan. 10, 2023, 18 pages including translation.
Clemens Par, "ECMA-407—International standard for modular 3D audio transport, Part II", FKT May 2015, May 1, 2015, 13 pages with translation.
Clemens Par, "ECMA-407—International standard for modular 3D audio transport, Part I", FKT Apr. 2015, Apr. 1, 2015, 11 pages with translation.
Clemens Par, "Poetry of Space—New 3D formats in the light of inverse audio coding", FKT May 2013, May 1, 2013, 17 pages with translation.
Clemens Par, "ECMA-407 'Instrant HD to UHD Audio' While Paper", Intercomms, Issue 26, dated 2016, 4 pages.
Clemens Par, "Rationalism versus Empirism—A Crash Course in Invariant Theory and a Tribute to Rudolf E. Kalman", Intercomms, Issue 25, dated 2015, 4 pages.
Clemens Par, "Taming the Beast in Mankind—Telecommunications in the 21st Century", Intercomms, Issue 24, dated 2015, 6 pages.

* cited by examiner (relates to the invariant analysis inside the brain)

FIG. 5 Sound localization with artificial head (Manikin)

Δ = original head radius
- reduced head radius

| Number | Center frequency (Hz) | Cut-off | Bandwidth |
|---|---|---|---|
| | | 20 | |
| 1 | 60 | 100 | 80 |
| 2 | 150 | 200 | 100 |
| 3 | 250 | 300 | 100 |
| 4 | 350 | 400 | 100 |
| 5 | 450 | 510 | 110 |
| 6 | 570 | 630 | 120 |
| 7 | 700 | 770 | 140 |
| 8 | 840 | 920 | 150 |
| 9 | 1000 | 1080 | 160 |
| 10 | 1170 | 1270 | 190 |
| 11 | 1370 | 1480 | 210 |
| 12 | 1600 | 1720 | 240 |
| 13 | 1850 | 2000 | 280 |
| 14 | 2150 | 2320 | 320 |
| 15 | 2500 | 2700 | 380 |
| 16 | 2900 | 3150 | 450 |
| 17 | 3400 | 3700 | 550 |
| 18 | 4000 | 4400 | 700 |
| 19 | 4800 | 5300 | 900 |
| 20 | 5800 | 6400 | 1100 |
| 21 | 7000 | 7700 | 1300 |
| 22 | 8500 | 9500 | 1800 |
| 23 | 10500 | 12000 | 2500 |
| 24 | 13500 | 15500 | 3500 |

FIG. 10 *Bark Scale*

INVARIANCE-CONTROLLED ELECTROACOUSTIC TRANSMITTER

The optimized derivation or the optimized transmission or the optimized recalculation (including the coding) of spatial audio signals can be attributed—according to the state of the art—to the shape of the listener's head, via acoustical measurement of the shape of the human head (Head-related transfer functions, HRTFs), or can be related to loudspeakers—by distributing the audio signal to a referential set of loudspeakers (e.g. ITU-R 5.1 Surround or NHK 22.2).

According to a successful so-called MPEG-H 3D audio core experiment in October 2015 at ISO/IEC JTC1/SC29/WG11 (Moving Pictures Expert Group, MPEG) with international standards ECMA-407 and ECMA-416 and further components, which are extensively described within the edition of November 2016 of "Fernseh- und kinotechnische Rundschau" ("FKT") with related bibliography, the state of the art is given by the patent applications as follow.

These patent applications are herewith introduced as a reference:

WO2016030545 ("Comparison or Optimization of Signals Using the Covariance of Algebraic Invariants"), WO2015173422 ("Method and Apparatus for Generating an Upmix from a Downmix Without Residuals"), WO2015128379 ("Coding and Decoding of a Low Frequency Channel in an Audio Multi Channel Signal"), WO2015128376 ("Autonomous Residual Determination and Yield of Low-residual Additional Signals"), WO2015049332 ("Derivation of Multichannel Signals from Two or More Basic Signals"), WO2015049334 ("Method and Apparatus for Downmixing a Multichannel Signal and for Upmixing a Downmix Signal"), WO2014072513 ("Non-linear Inverse Coding of Multichannel Signals"), WO2012032178 ("Apparatus and Method for the Time-oriented Evaluation and Optimization of Stereophonic or Pseudo-stereophonic Signals"), WO2012016992 ("Device and Method for Evaluating and Optimizing Signals on the Basis of Algebraic Invariants"), WO2011009650 ("Device and Method for Optimizing Stereophonic or Pseudo-stereophonic Audio Signals"), WO2011009649 ("Device and Method for Improving Stereophonic or Pseudo-stereophonic Audio Signals"), WO2009138205 ("Angle-dependent Operating Device or Method for Obtaining a Pseudo-stereophonic Audio Signal"), together with EP1850639 ("Systems for Generating Multiple Audio Signals from at Least One Audio Channel").

In particular, WO2016030545 ("Comparison or Optimization of Signals Using the Covariance of Algebraic Invariants") together with WO2012016992 ("Device and Method for Evaluating and Optimizing Signals on the Basis of Algebraic Invariants") describe—as are named as such at Ecma TC32-TG22—the so-called Par-Hilbert invariants, which are related to orthogonal projections onto algebraic cones, which can be legitimately regarded as Principal components of the shape of the human pinna reflecting the sound.

These invariants are always subject to the trained human spatial auditory perception and are—with reference to the head—dependent on the human anatomy of each individual.

By using so-called head tracking, which reconstructs and acoustically compensates willful or unwillful (involuntary) head movements in order to re-deliver stable localization, with an accuracy of more than 99 percent HRTFs can be determined in subsequently calculated time frames from the original loudspeaker signals, by using so-called convolution in the frequency domain (in most cases by using FFT or QMF) whereas the equalization curb of the used headphones has to be taken into account according to the state of the art.

This yields latencies of averagely 10 ms and requires the additional equalizing of, for instance, broadcasting signals in conjunction with the respectively used headphones—a fact which impedes broad use of such signals in an everyday environment.

ECMA-416 likewise operates in the frequency domain and cannot resolve the problem of increased latency.

The broadcaster agnostically would wish a directly rendered stereo signal for any application—for simultaneously used headphones and loudspeakers, with Stereo and Surround and three-dimensional loudspeaker configurations, in real time.

For the notion of the invention, it is critical to understand that (in the sense of an approximation) the sound reflections at the pinna comprise the same algebraic cones as are mentioned within WO2016030545 ("Comparison or Optimization of Signals Using the Covariance of Algebraic Invariants") and WO2012016992 ("Device and Method for Evaluating and Optimizing Signals on the Basis of Algebraic Invariants").

Furthermore, the Z-transform $$H(s) = \frac{s - \frac{1}{RC}}{s + \frac{1}{RC}} = \frac{1 - sRC}{1 + sRC'}$$

can be interpreted as an "Inductor-resistor-capacitor problem"—hence the 6th problem of Hilbert—which has been extensively studied by Rudolf E. Kalman. Such Z-transform at the same time describes an all-pass filter, which implies a phase shift of 90° with the frequency $$\omega = 1/RC$$

and consequently the fact that invariants of order 2 (in three-dimensional space) can be approximated by such of order 1 (in two-dimensional space, hence Stereo).

When replacing the original signal by its polynomial interpolation (e.g. according to Chebyshev) and when approximately simulating the all-pass filter by turning a loudspeaker by 90°, the so-called substitution determinant can be directly recognized by which the subsequently Z-transformed stereo signal differs in its three-dimensional representation from its initial Par-Hilbert invariants of order 1.

By definition, according to David Hilbert ("Über die vollen Invariantensysteme"), undergoing such transformations the resulting algebraic invariants only differ by their substitution determinant.

This fact not only leads to direct comparison according to WO2016030545 ("Comparison or Optimization of Signals Using the Covariance of Algebraic Invariants") but also to the approximate and simultaneous calculation and transmission—for use with headphones and loudspeakers simultaneously, with Stereo and Surround and three-dimensional loudspeaker configurations in real time, see above.

It is easy to find a loudspeaker configuration, which optimally responds to such criteria, even without all-pass filters—whereas the necessary phase inversion can already been deducted from $$H(s) = \frac{s - \frac{1}{RC}}{s + \frac{1}{RC}} = \frac{1 - sRC}{1 + sRC'}$$

For survival in a natural environment, spatial hearing yields the first stimulus of approaching danger—according to the German proverb "He who does not want to hear needs to feel."

As shown by FIGS. 5 and 6, both human pinnae (after a long evolutionary process) represent forwardly directed double cones with their polarity reversion—hence exactly the algebraic cones shown in FIG. 1 to FIG. 3.

Lord Raleigh's experiments in spatial hearing show the differences which lead to spatial perception in our brains, i.e. to so so-called Interaural time differences (ITDs) and Interaural intensity differences (IIDs), which—according to already memorized invariants in the brain—lead to the notion of space in real time.

Differing from HRTFs, this document wishes to introduce the technical term of CC-HRTFs (Critical cue head-related transfer functions), hence such components of ITDs and IIDs, which directly appeal to such memorized invariants.

At the same time—for the perceived critical cues—the structure of the cochlea is decisive. Such structure is fully yielded by the experimentally derived Bark scale, see FIG. 10.

According to the invention, the bandwidths of the Bark scale insinuate (instead of measuring the HRTFs) a reduction of the diameter of the head (e.g. by roughly 10%) without inducing a critical change of localization, however, to leave the point of measurement for the CC-HRTFs (ear opening) unchanged (this criterion is already met by a silicone tube roughly exceeding each ear opening by 1 cm). See FIG. 7.

Such device enables the approximate reconstruction of space by means of an array e.g. according to FIG. 8 for Stereo and for ITU-R 5.1 Surround (the center channel is not shown, as only yielding mono signals in this position according to ITU-R BS.775-1):

The Stereo speakers FL and FR are completed by loudspeakers BtFL and BtFR on the floor, which are shifted vertically by 90°. At the rear (and with polarity reversion in the case of Stereo) the loudspeakers BL and BR are added, e.g. in the same way as is the case with ITU-R 5.1 Surround, and are completed by BtBL and BtBR on the floor, which are shifted vertically by 90°.

N.B. A variant represents the omission of BL and BR and the mounting of BtBL and BtBR at the same height as FL and FR without essentially altering the working principle. Hence, all possible positioning variants are within the scope of the invention.

N.B. Another astonishingly performing variant represents the additional omission of BtFL and BtFR, which implies that apart from front speakers FL and FR at minimum two loudspeakers need to be shifted vertically by 90° in order to achieve the technical effect of spatial reconstruction.

All loudspeakers, and particularly BtFL and BtFR and BtBL and BtBR, can be subjected to equalizing, in order to emphasize the spatial cues. A trivial solution is the simple covering of BtFL and BtFR and BtBL and BtBR with a cloth each.

N.B. According to the state of the art, an artificial head is a Stereo microphone adjusted to the human anatomy of the head whereas with each earhole the eardrum is replaced by the membrane of a omnidirectional microphone in the same position, in order to measure the incoming sound oscillation. The measured signals are called HRTFs. However, an artificial head with the structure shown in FIG. 7 is unknown, according to the state of the art.

As an example, in the sweet spot of the loudspeaker array the so-called CC-HRTFs (derived from HRTFs) are measured with an artificial head according to FIG. 7, which is unknown to prior art. The CC-HRTFs are equivalent to L' and R' in FIGS. 11A-11B and FIGS. 12A-12B.

As FIGS. 11A-11B and FIGS. 12A-12B show, the output signal is derived as follows:

It can be shown by experiment that an audio signal below 120 Hz is uncritical to localization, as its diffraction by the anatomy of the head remains neglectable. Such frequency range can consequently without compromise be maintained within the output signal via a low-pass filter (1111*a* and 111*b*, and 1211*a* and 1211*b* respectively, see our application examples).

The sound engineer furthermore extends the high frequency range in most cases by selective use of microphones or by equalizing, whereas the Bark scale likewise insinuates an extension of the CC-HRTFs.

Practically, the original signal in the frequency range above 120 Hz is reduced in amplitude in such way that—with respect to the CC-HRTFs, added by means of a high-pass filter (by elements 1114*a* and 1114*b*, and 1115*a* and 1115*b* respectively, see our application examples)—no further in-head localization occurs (a phenomenon with most stereo signals which have not exclusively been designed for headphones). See elements 1112*a* and 1112*b*, and 1113*a* and 1113*b* respectively, and 1212*a* and 1212*b*, and 1213*a* and 1213*b* respectively in our application examples.

Finally, within the output signal, the Bark scale insinuates still to increase the amplitude of CC-HRTFs with respect to their physical harmonics—in order to increase their robustness. This can be achieved e.g. by means of a so-called octave filter (1109*a* and 1109*b*, and 1209*a* and 1209*b* respectively, see our application examples).

N.B. An octave filter is a given frequency filter, the frequency limits of which show a constant ratio of 2:1. The pass band is the respective frequency range of a frequency filter, which is passed within an electrical signal. The limit of such pass band usually is defined as an amplitude reduction of 3 dB or of 71% respectively. When designating the lower frequency limit as $f_1$, then for the upper frequency limit $f_2$ the following applies $$f_2 = f_1 * 2$$

and for the filter's center frequency $$f_o = \sqrt{f_1 * f_2} \approx 1.4142 * f_1$$

Most electroacoustic measurements are executed with filters and referential frequencies according to DIN EN ISO 266:1997-08 whereas for the center frequency $$f = 1000 \text{ Hz}$$

applies.

N.B. The octave filter can be calibrated according to technical criteria (improvement of the binaural reproduction of the measured HRTFs or CC-HRTF respectively, e.g. an augmentation in amplitude by 3 dB of the octave with the center frequency 4000 Hz) and likewise due to esthetic principles. Generally, the transducer remains constant in its parameters which implies that all components can be calibrated prior to continuous operation. Particularly, a loss of binaural information can only be determined empirically.

The calibration of parameters "according to the ear" prior to continuous operation hence is given intrinsically and should not be objected in terms of clarity.

The resulting output signal (1110*a* and 1110*b*, and 1210*a* and 1210*b* respectively, see our application examples) experimentally shows the following properties: the added CC-HRTFs enable the movement of the head—exceeding to more than 90° without head tracking. They are equally reproduced on loudspeakers with Stereo and—independently—over headphones. The use of dipole speakers is not mandatory for an adequate listening result. Localizations and sound features of the original recording facility are reproduced with fidelity.

However, the immersive experience is three-dimensional and comparable with NHK 22.2. The silent cause for this spatial reconstruction—finally in the sense of an inverse problem, see ECMA-407—are above comments about substitution determinants etc.

N.B. According to the state of the art, an artificial head is a Stereo microphone adjusted to the human anatomy of the head whereas with each earhole the eardrum is replaced by the membrane of a omnidirectional microphone in the same position, in order to measure the incoming sound oscillation. The measured signals are called HRTFs. However, an artificial head with the structure shown in FIG. 7 is unknown, according to the state of the art.

Figure 1:
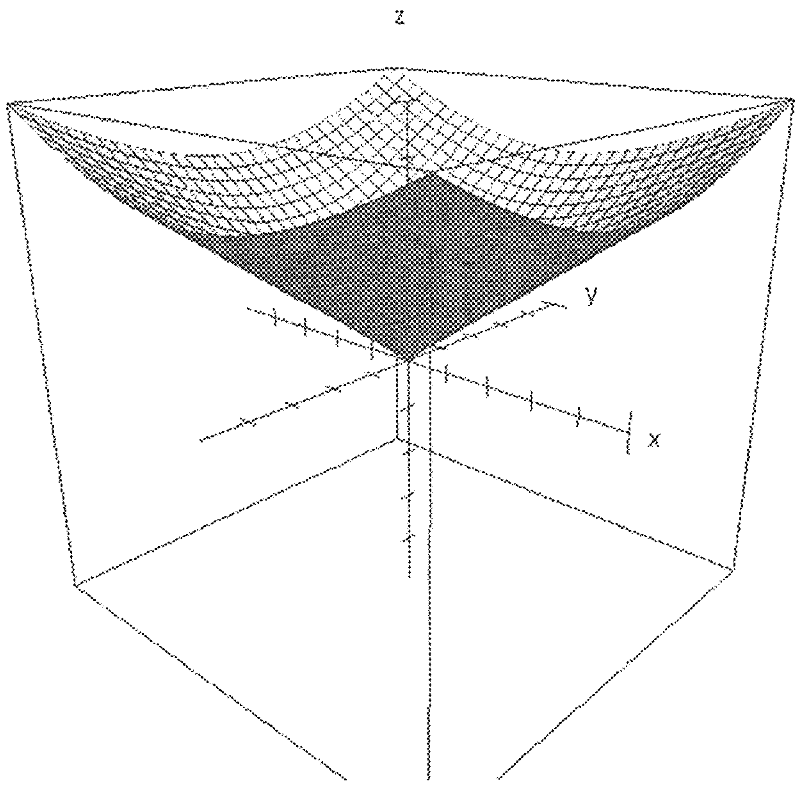
FIG. 1 to FIG. 4 cite WO2016030545 ("Comparison or Optimization of Signals Using the Covariance of Algebraic Invariants") with algebraic cones, which enable a construction of Par-Hilbert invariants for order 1 (two-dimensional representation).
Figure 2:
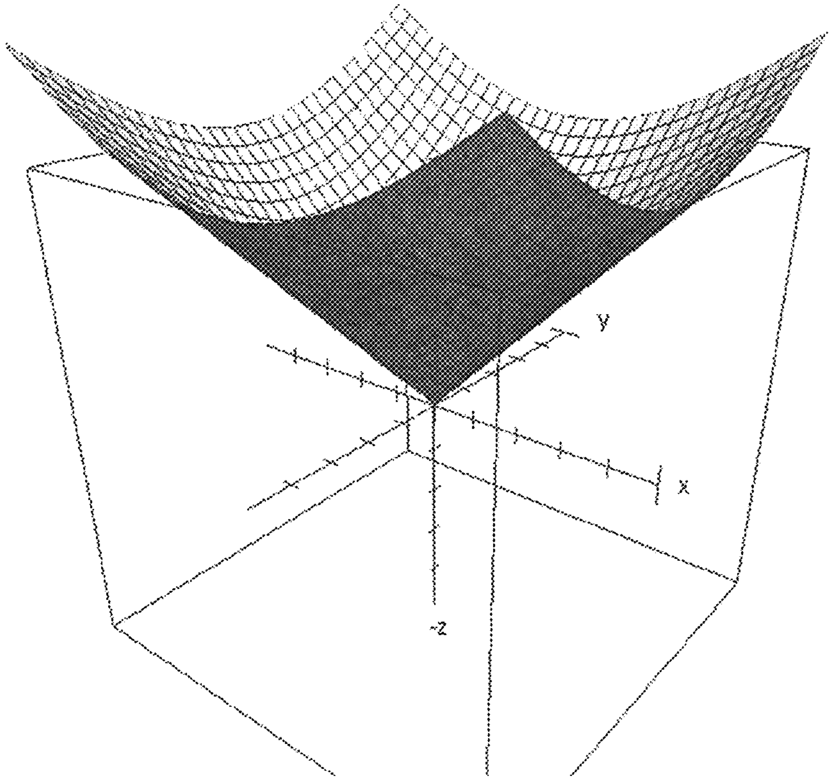
Figure 3:
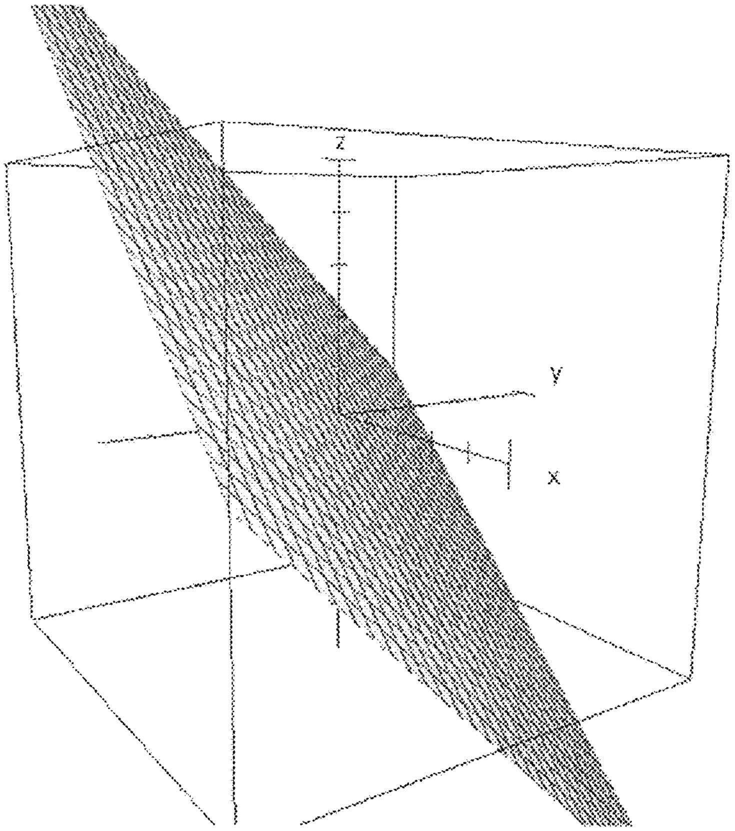
Figure 4:
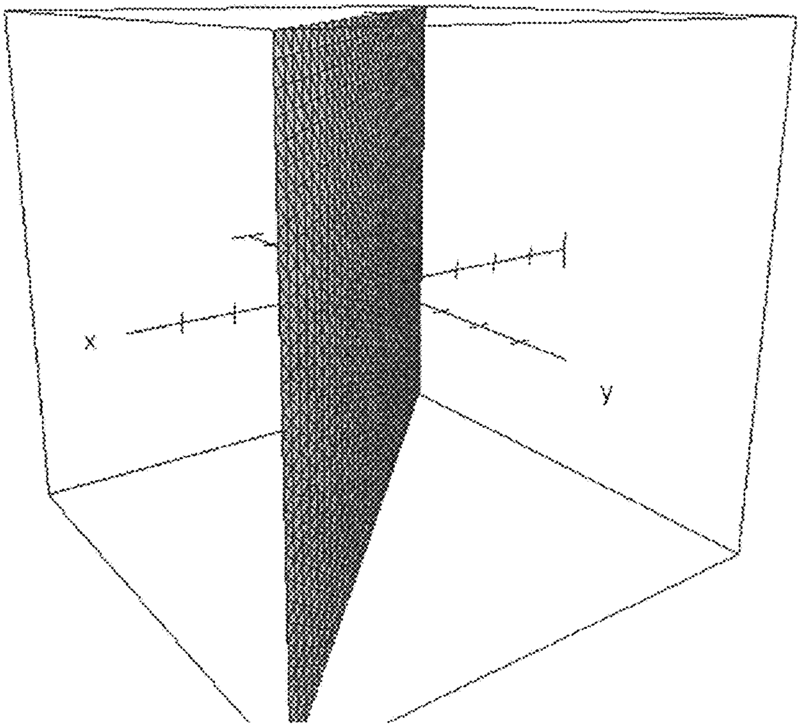
Figure 5:
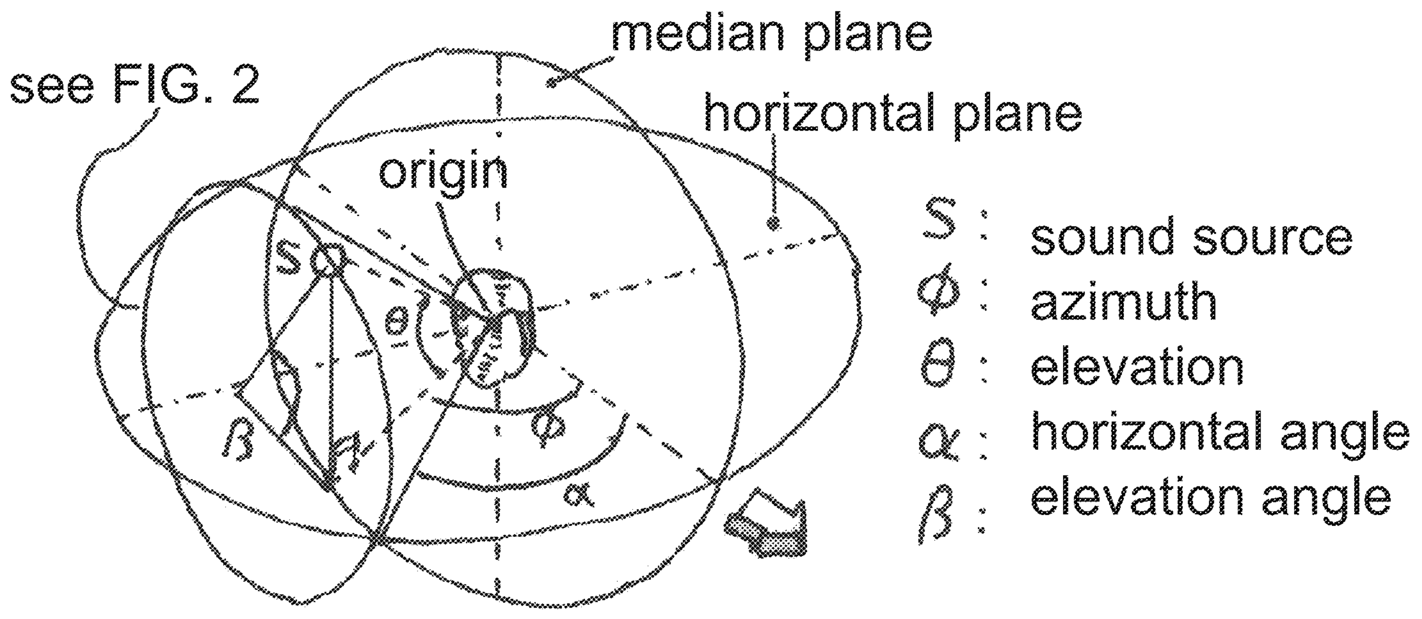
FIG. 5 represents an artificial head ("Manikin") and at the same time shows with reference to FIG. 2 that the shape of the human ear follows FIG. 1 to FIG. 3, for detecting invariants. This in two dimensions per pinna. The annotations show the elements for localization of a sound event in space.
Figure 6:
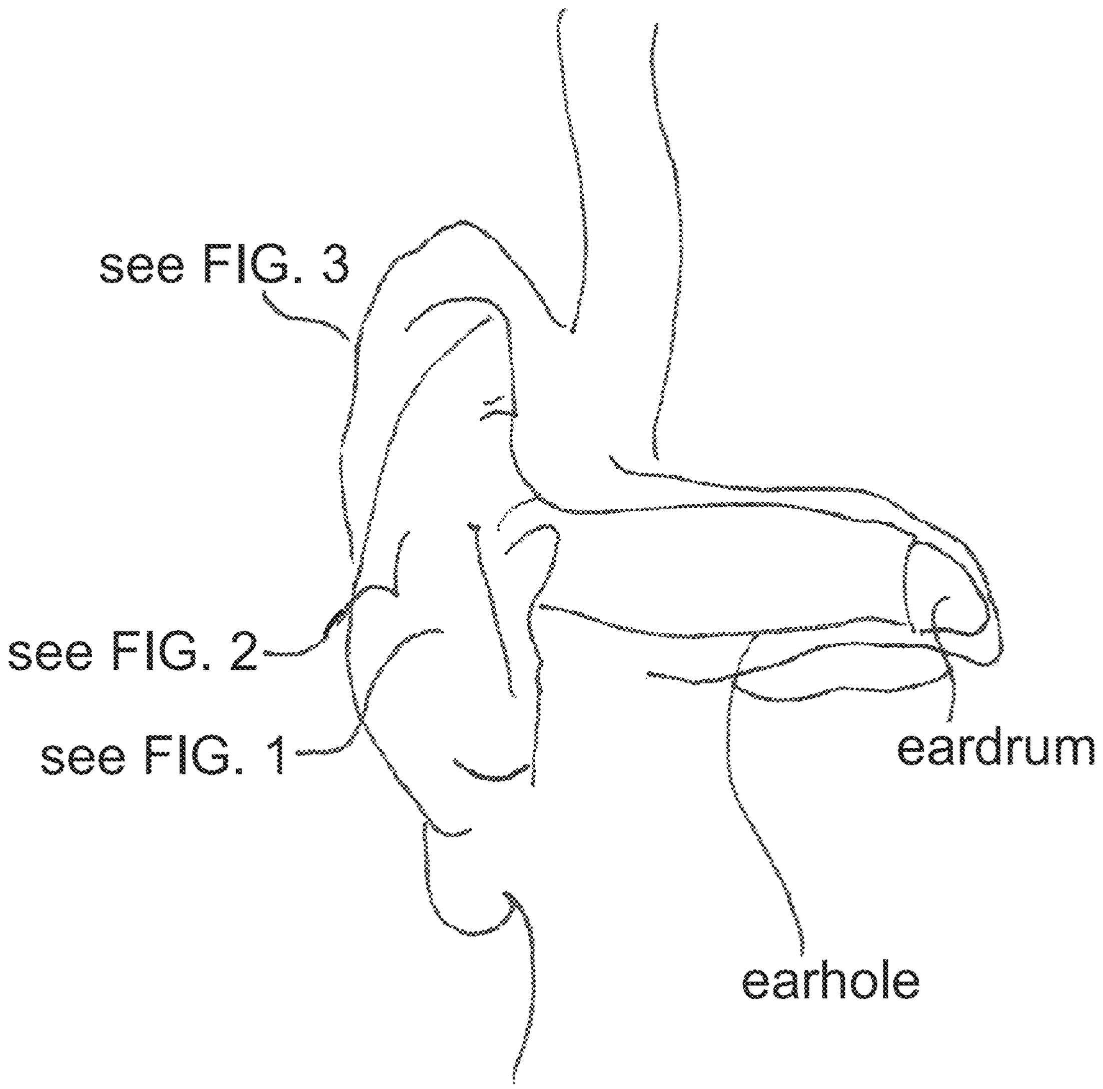

FIG. 6 shows in a separate scheme the earhole and illustrates in the same way the manifestation of the algebraic cones of FIG. 1 and FIG. 2 and FIG. 3 as Principal components of the structure of the pinna. Please note that FIG. 4 references the critical plane of the projected invariants and should not be related to the pinna but to our cerebral functions and to the cochlea.

Figure 7:
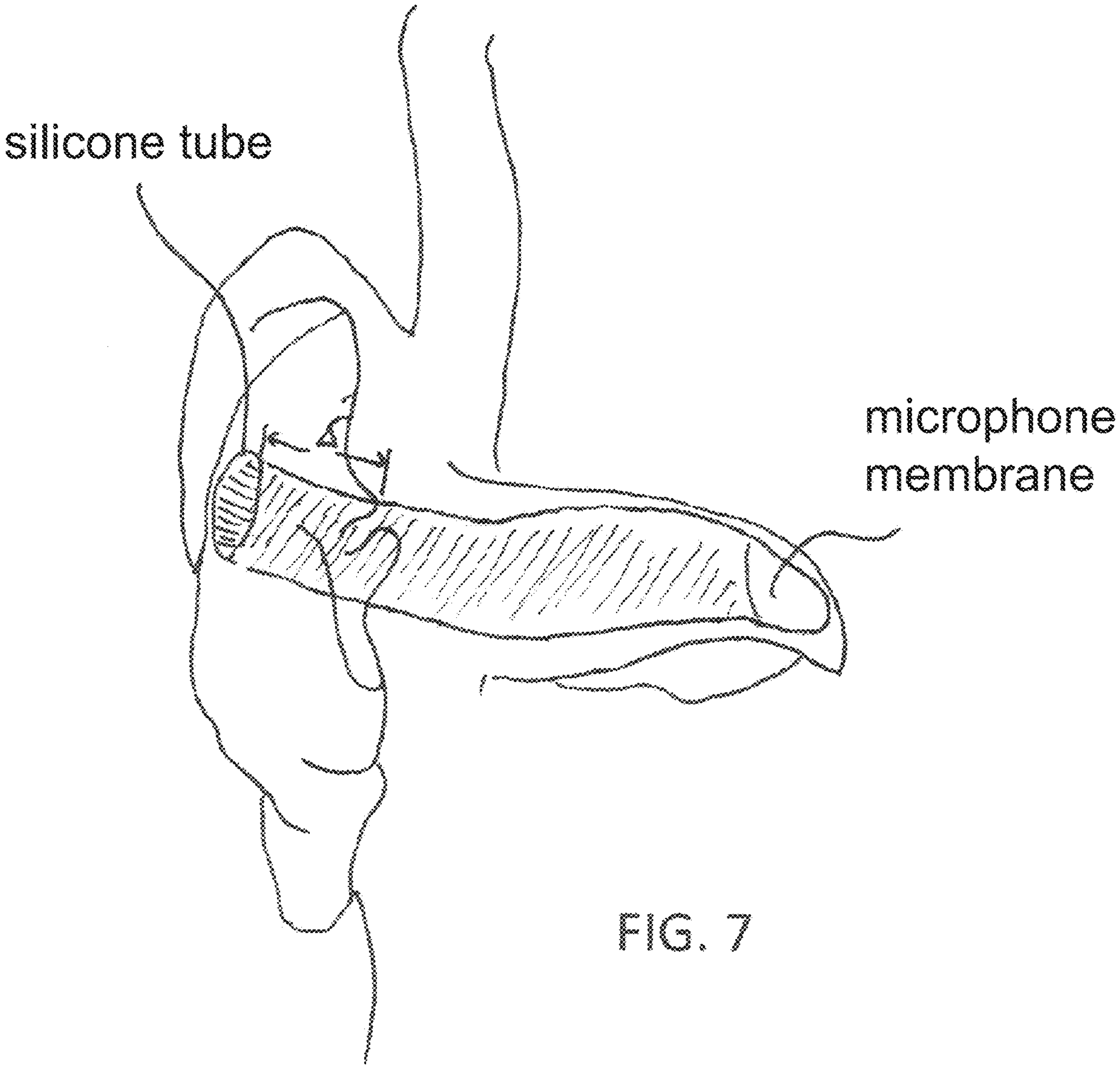

FIG. 7 shows how to measure CC-HRTFs by means of a silicone tube roughly exceeding an artificial head by 1 cm. A is sufficiently robust with a value of 1 cm provided that the artificial head is placed in the sweet spot according to FIG. 8, see description above.

Figure 8:
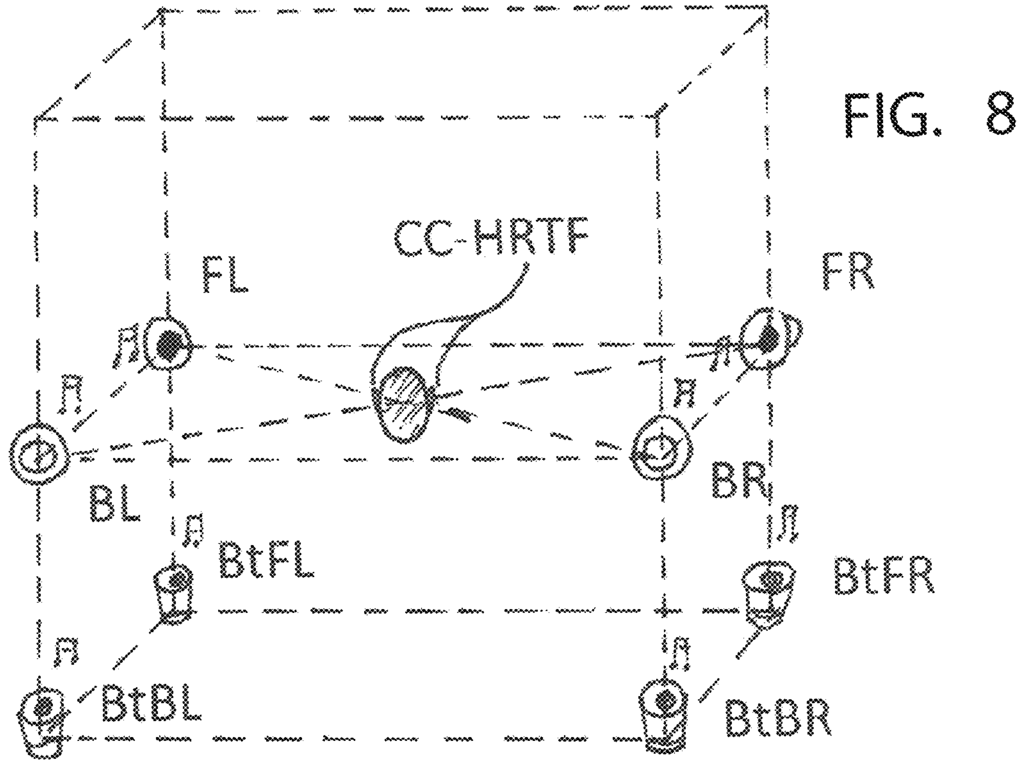

FIG. 8 shows a given array for the measurement of CC-HRTFs, see description above and below.

Figure 9:
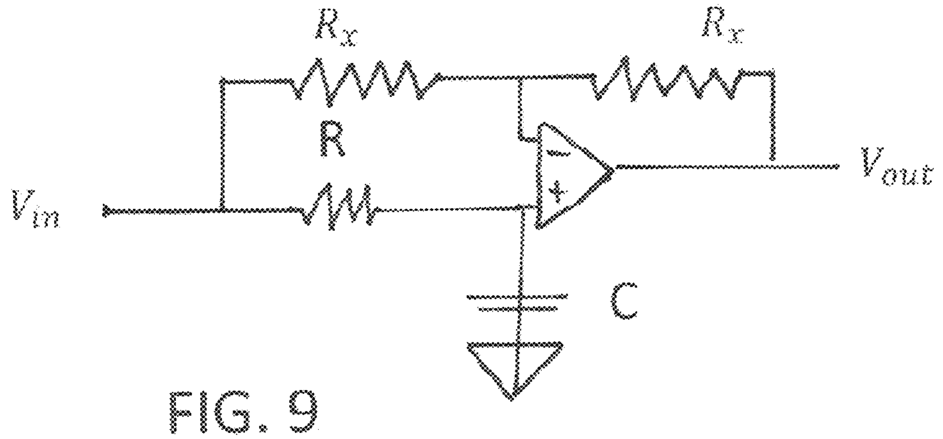

FIG. 9 shows an all-pass filter according to the state of the art, see also description above.

FIG. 10 shows the so-called Bark scale, which—by means of experiment—comprises the critical frequencies with respect to the structure of the cochlea.

Figure 11A:
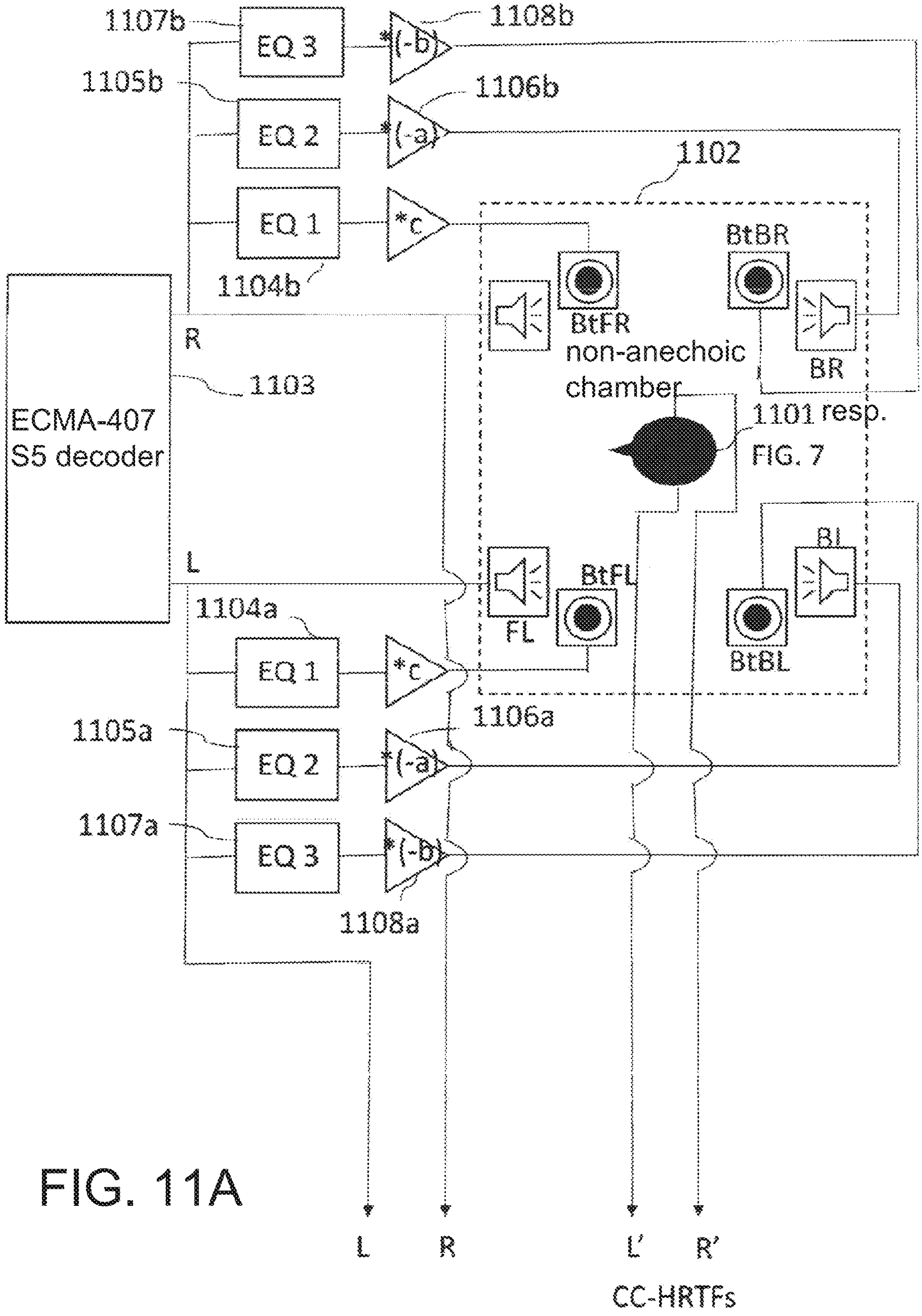
Figure 11B:
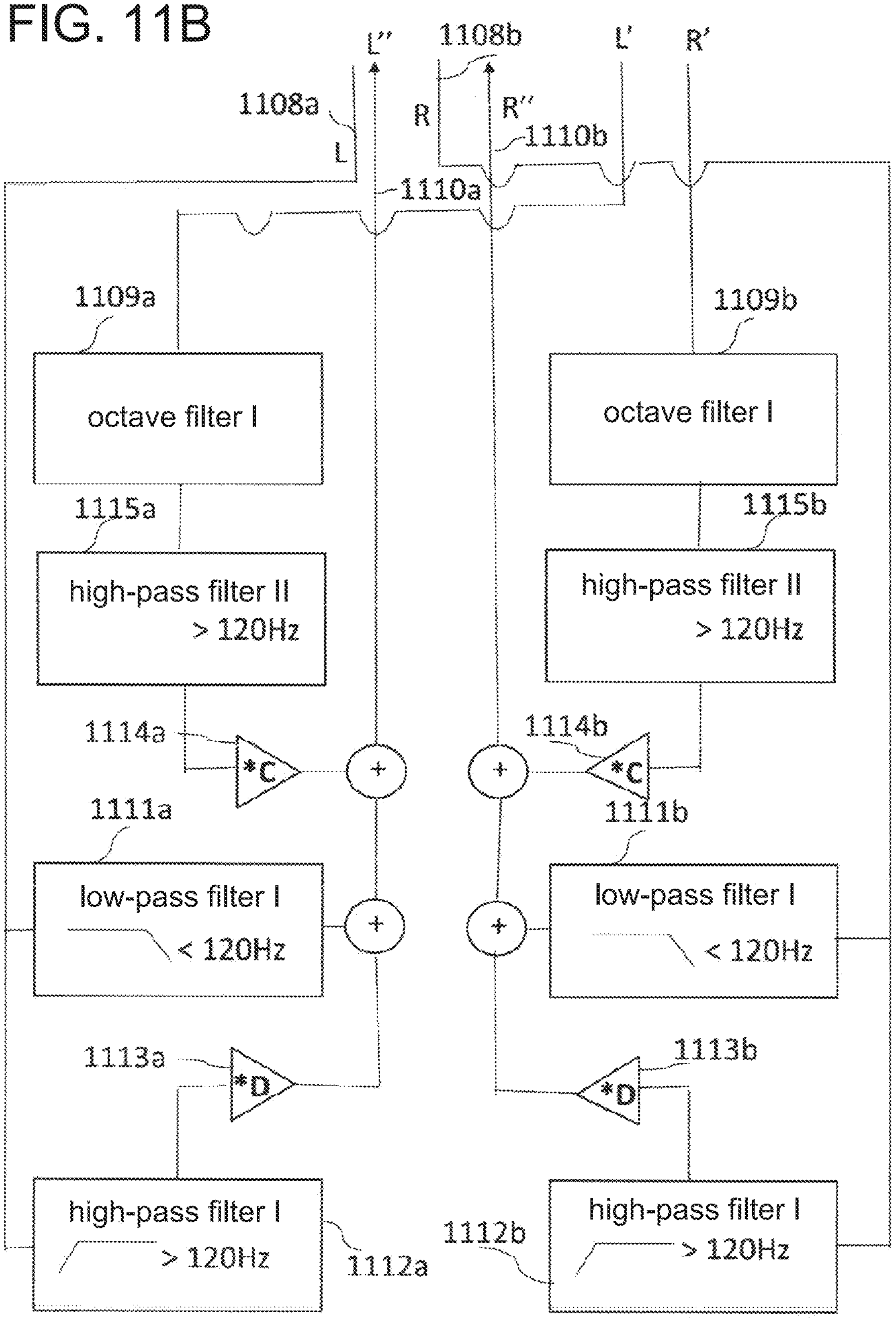

FIGS. 11A-11B show the adding of the signal compounds, which at the same time lead to a simultaneous calculus and transmission for headphones and for loudspeakers—for Stereo and for Surround and for three-dimensional loudspeaker arrays in real time, see above and below.

Figure 12A:
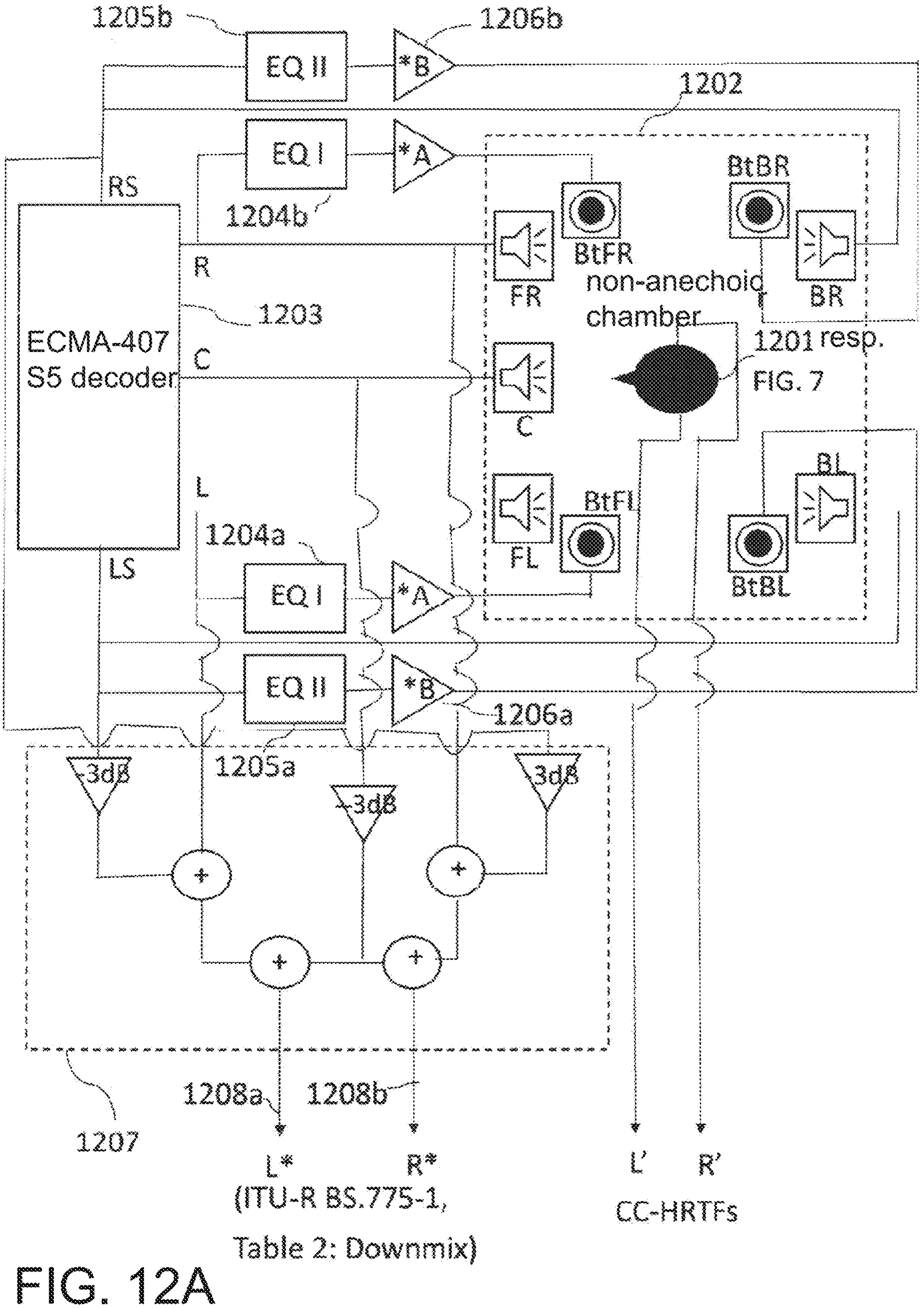
Figure 12B:
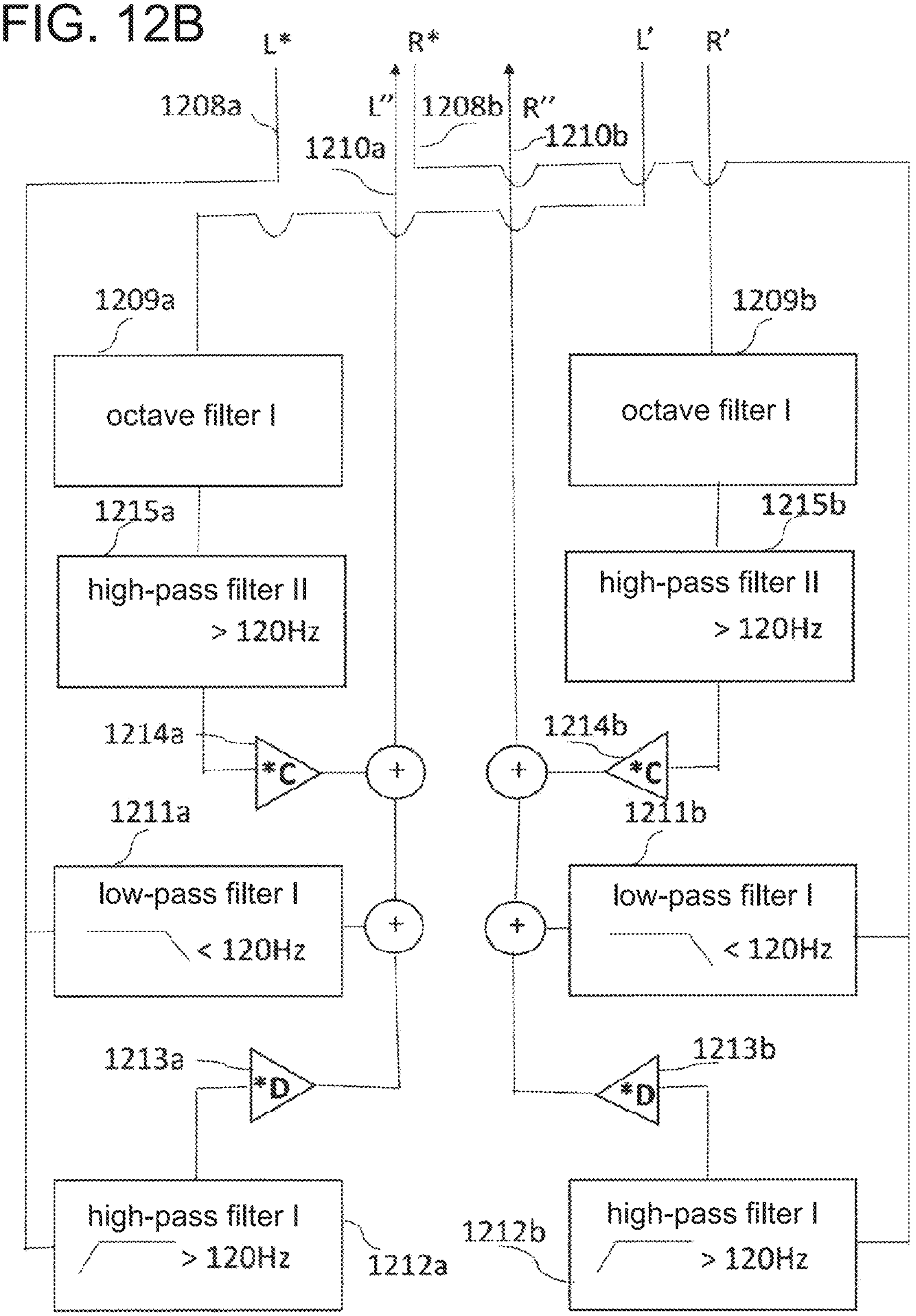

FIGS. 12A-12B show a second embodiment for ITU-R BS.775-1 5.1 Surround.

PRELIMINARY REMARKS FOR THE SHOWN EMBODIMENTS OF THE INVENTION

The CC-HRTFs are measured via an artificial head which, unlike the state of the art, has been reduced by averagely 10% in diameter, see FIG. 7. Δ denotes the difference between the original natural head radius and the reduced head radius. The earhole of the shown left ear opening is lengthened by Δ, by means of an exceeding silicone tube—in order to restore the natural right ear distance. In the same way, the earhole of the right ear opening is lengthened by Δ, by means of an exceeding silicone tube—in order to restore the natural right ear distance. As is the case with the ordinary artificial head, the shown left eardrum is replaced by a left omnidirectional microphone membrane in such way that the adjacent left omnidirectional microphone with given impedance records the sound event L' in the sweet spot of a non-anechoic room. As is the case with the ordinary artificial head, the shown right eardrum is replaced by a right omnidirectional microphone membrane in such way that the adjacent right omnidirectional microphone with given impedance records the sound event R' in the sweet spot of a non-anechoic room. If two front loudspeakers FL and FR, see FIG. 8, are completed by at minimum two additional loudspeakers which are, with reference to these front loudspeakers, shifted vertically by 90°, see for instance BtFL and BtFR, we name the binaural measurement signal L' and R' also left CC-HRTF signal L' and right CC-HRTF signal R'. Two such devices are shown by FIGS. 11A-11B and FIGS. 12A-12B, as exemplary embodiments of the invention.

EXEMPLARY EMBODIMENTS OF THE INVENTION

First Exemplary Embodiment

A preferable first embodiment of the invention is a device for the analog deriving of CC-HRTFs in real-time, see FIGS. 11A-11B.

To an artificial head (1101) which has been reduced, with reference to the Bark scale, by averagely 10% with respect to the natural human head, see FIG. 7, two silicone tubes are applied which are exceeding the pinnae by averagely 1 cm, in order to measure the CC-HRTFs. The eardrum of the human ear is in the usual way—as is the case for the artificial head—replaced by a microphone with given impedance, see also above definition of the term of the artificial head, according to the state of the art.

The artificial head (1101 or FIG. 7 respectively) is mounted in the sweet spot of a non-anechoic chamber (1102) with a loudspeaker array, for instance, according to FIG. 8.

In one embodiment, for instance, a stereo signal is coded as a mono signal with 2 kbps additional payload by means of ECMA-407 and is—after decoding in conformance to the standard (1103)—fed to a left front speaker FL and to a right front speaker FR.

N.B. According to international standard ECMA-407, in the case of a stereo signal to be coded, such signal is described via the so-called "signal analysis" by transmitted parameters ("configuration data") and a mono downmix. The "signal analysis" is preferably embodied according to WO2016030545 by the determination of chosen points on the basis of invariants of the first signal and the determination of a signal analysis parameter on the basis of the covariance of the chosen points of the first signal with the second signal. The output signal from the decoder is derived by means of specific amplifications and delays of the mono signal and is fed forward as stereo signal L and R.

N.B. Sound reflections in space form the so-called first main reflection and the secondary main reflection. The frequency spectrum of these two main reflections shows spectral losses. An equalizer (e.g. a graphic or parametric equalizer) enables the boosting and diminishing of specific frequencies and hence can yield the shaping of these frequency losses, by means of acoustic comparison or by measurement.

N.B. Generally, an equalizer comprises several filters in order to edit the spectrum of the input signal. Usually an equalizer is used to correct the linear distortion of a signal. Essentially the two following embodiments exist:

A graphic equalizer shows an individual control with each frequency band (and as an autonomous device shows 26 up to 33 frequency bands, with 31 as the typical average, with a one third octave's width each) in such way that the curb of the frequency correction is shown "graphically" by the controls.

The parametric equalizer allows the calibration for one or more frequency bands of the center frequency and the change of amplitude (with the semiparametric equalizer) and frequently also the quality Q of filtering according to the bandwidth (with the fully parametric equalizer).

The frequency loss of the first main reflection with respect to the original signal is subsequently mimicked by such equalizing (1104*a*, a trivial solution is the simple covering of BtFL and BtFR and BtBL and BtBR with a cloth each), and the resulting left ECMA-407 output signal after such equalizing is directly or with reduced amplitude fed to the loudspeaker BtFL left below on the floor, which is shifted vertically by 90° with respect to FL. In the same way, the resulting right ECMA-407 output signal after such equalizing (1104*b*) is directly or with reduced amplitude fed to the loudspeaker BtFR right below on the floor, which is shifted vertically by 90° with respect to FR.

The frequency loss of the first or second main reflection with respect to the original signal is mimicked by means of equalizing (1107*a*), and the resulting polarity-reversed backwards left ECMA-407 output signal—after such equalizing and adjustment of amplitude (1108*a*)—is directly fed to the loudspeaker BtBL left below on the floor, which is shifted vertically by 90° with respect to BL. In the same way, the resulting polarity-reversed backwards right ECMA-407 output signal—after such equalizing (1107*b*) and adjustment of amplitude (1108*b*)—is directly fed to the loudspeaker BtBR right below on the floor, which is shifted vertically by 90° with respect to BR.

With our present first embodiment of ECMA-407, the agnostically standardized "signal analysis" of which allows—in conformance to the standard—the determining of invariants according to WO2016030545 ("Comparison or Optimization of Signals Using the Covariance of Algebraic Invariants") it is easy to understand—via above interpretation of the Z-transform and of the all-pass filters respectively—why these invariants comprised by the CC-HRTFs, which have been extracted by our artificial head, determine the entire process of hearing.

N.B. Algebraic invariants denote the intersections—as defined by WO2016030545—of an arbitrarily chosen diagonal via the origin and the cathode ray of the goniometer, by which our brain—independently from the used recording method—localizes a sound event both with loudspeaker-related and with head-related recording techniques. With loudspeaker-related recording techniques played back via headphones in-head localization may occur, which implies that when mixing CC-HRTFs with loudspeaker-related signals the ratio has to be such that the effect of in-head localization in the sense of a limit does not occur furthermore, also see first embodiment above, and remarks above and below for the calibration of the elements, respectively.

The CC-HRTFs additionally are in a next step enhanced according to the Bark scale, e.g. with an octave filter (1109*a* and 1109*b*), by amplifying in a targeted manner the harmonics of the CC-HRTFs as determined by FIG. 8.

N.B. The calibration also takes place according to esthetic principles. The transducer generally remains constant in such way that—prior to continuous use—all elements can be calibrated via measurement or acoustical comparison. The transducer per se operates in real time. Real time denotes according to DIN 44300 ("Informationsverarbeitung"), part 9 ("Verarbeitungsabläufe") the "operating of a computing system whereas programs for the computing of given data are continuously ready to operate in such way that the computing results are available within a given time frame. The data may occur—depending on the use case—in a timely random distribution or with instants of time, which can be predetermined."

The resulting stereo signal (1110*a* and 1110*b*) is composed as follows: a low-pass filter (1111*a* and 1111*b*) adds FL and FR seamlessly below 120 Hz to the stereo output signal of our embodiment. A high-pass filter (1112*a* and 1112*b*) adds FL and FR both equalized and with decreased amplitude (1113*a* and 1113*b*) below the critical limit where—together with the measured CC-HRTFs—in-head localization would occur with headphone reproduction.

Finally the measured CC-HRTFs are added via a high-pass filter (1115*a* and 1115*b*) in such way (1114*a* and 1114*b*) that they fully comply with the sound engineer's attempt to enhance the high frequencies.

Second Exemplary Embodiment

A preferable second embodiment of the invention is a device for the analog deriving of CC-HRTFs in real-time, see FIGS. 12A-12B.

To an artificial head (1201), which has been reduced—with reference to the Bark scale—by averagely 10% with respect to the natural human head, see FIG. 7, two silicone tubes again are applied, which are exceeding the pinnae by averagely 1 cm, in order to measure the CC-HRTFs. The eardrum of the human ear is in the usual way—as is the case for the artificial head—replaced by a microphone with given impedance.

The artificial head (1201) is mounted in the sweet spot of a non-anechoic chamber (1202) with a loudspeaker array according to FIG. 8, which is enhanced by a frontally positioned center channel C. An array for ITU-R BS.775-1 5.1 Surround can be easily recognized.

In one embodiment, for instance, a Surround signal is coded by means of ECMA-407 (1203) and is—after decoding—fed forward as follows: C is fed to the center speaker C. L is fed to the loudspeaker FL. R is fed to the loudspeaker FR. LS is fed to the loudspeaker BL. RS is fed to the loudspeaker BR.

The frequency loss of the first main reflection with respect to the original signal is mimicked by equalizing (1204*a*, a trivial solution is the simple covering of BtFL and BtFR and BtBL and BtBR with a cloth each), and the resulting ECMA-407 output signal L after such equalizing is directly or with reduced amplitude fed to the loudspeaker BtFL left below on the floor, which is shifted vertically by 90° with respect to FL. In the same way, the resulting ECMA-407 output signal R—after such equalizing (1204_b_)—is directly or with reduced amplitude fed to the loudspeaker BtFR right below on the floor, which is shifted vertically by 90° with respect to FR.

The frequency loss of the first or second main reflection with respect to the original signal is mimicked by means of equalizing (1205_a_), and the resulting ECMA-407 output signal LS—after such equalizing—is directly or with reduced amplitude (1206_a_) fed to the loudspeaker BtBL left below on the floor, which is shifted vertically by 90° with respect to BL. In the same way, the frequency loss of the first or second main reflection with respect to the original signal is mimicked by means of equalizing (1205_b_), and the resulting ECMA-407 output signal RS—after such equalizing—is directly or with reduced amplitude (1206_b_) fed to the loudspeaker BtBR left below on the floor, which is shifted vertically by 90° with respect to BR.

The downmixer 1107 references Table 2 of ITU-R BS.775-1 in order to obtain a stereo downmix in the 2/0 format, i.e. for the left downmix channel L* (1108_a_) and the right downmix channel R* (1108_b_) the equations $$L^*=L+0.7071*C+0.7071*LS$$

$$R^*=R+0.7071*C+0.7071*RS$$

apply.

The measured signals L' and R' (the CC-HRTFs) of our artificial head additionally are in a next step enhanced according to the Bark scale, e.g. with an octave filter (1209_a_ and 1209_b_), by amplifying in a targeted manner the harmonics of L' and R'.

The resulting stereo signal (1210_a_ and 1210_b_) is composed as follows: a low-pass filter (1211_a_ and 1211_b_) adds the downmix signal L* and R* seamlessly below 120 Hz to the stereo output signal of our embodiment. A high-pass filter (1212_a_ and 1212_b_) adds L* and R* with decreased amplitude (1213_a_ and 1213_b_) below the critical limit where—together with L' and R' (the measured CC-HRTFs)—in-head localization would occur with headphone reproduction.

Finally, L' and R' (the measured CC-HRTFs) are added via a high-pass filter (1215_a_ and 1215_b_) in such way (1214_a_ and 1214_b_) that they fully comply with the sound engineer's attempt to enhance the high frequencies.

N.B. All these steps, as can be seen from the limits, can be automatized in real time, as the measured HRTFs of the artificial head, which has been reduced in diameter, hence the CC-HRTFs, can be determined by means of so-called convolution (in frequency domain, generally by means of FFT or QMF) with subsequently computed time frames, or since the passing of an embodiment according to FIG. 8 in real time can be achieved by means of calibration of all elements, for instance, of FIGS. 11A-11B and FIGS. 12A-12B.

Instead of the shifting of loudspeakers, an all-pass filter can be inserted for each loudspeaker, which is shifted by 90°. With respect to invariants, the same considerations apply as above.

N.B. According to the state of the art, HRTFs can be computed by means of convolution in real time, see above. The same is also valid for CC-HRTFs in such way that an array according to FIG. 8 can be a forteriori omitted, by means of appropriate computing and automatization, see above. Hence, such computations and automatizations are within the scope of the invention.

Disclaimer according to Art. 9a BVG (Republic of Austria)—made due to the fact that the present invention may be related to an offer from 2012—declined by the inventor—to design the targeting system for two types of fighter jets. International standards ECMA-407 and ECMA-416—together with the patent applications referenced above—have been standardized by Fraunhofer IIS at ISO/IEC JTC1/SC29/WG11 (MPEG) as so-called "Low Complexity Profiles for MPEG-H 3D Audio"—whereas a patent statement from StormingSwiss GmbH domiciled at Morges (Switzerland) from 2019 was ignored. This patent statement contains the disclaimer that any eventual military use of MPEG-H (a forteriori, due to the Austrian nationality of the inventor as the 100% shareholder of StormingSwiss GmbH) will imply a breach of (constitutional Austrian) neutrality and of the (Austrian) State Treaty (from 1955). The rationale for this disclaimer is a communication in c.c. from Jul. 11, 2017 from Univ.-Prof. Dr. Fritz Fraberger (KPMG Alpen-Treuhand GmbH in Vienna) to the Austrian Federal President, stating that—in case of military licensing of MPEG-H—a breach of (constitutional) neutrality automatically will occur with respect to ECMA-407 (in the sense of a state crime, "Staatsverbrechen"). The patent statement and the occurrence of a breach of the State Treaty (from 1955) by the Republic (of Austria) was communicated to BMI (the Austrian Ministry of Internal Affairs) in Spring 2019. This occurrence happened due to further negligence by the (Austrian) Federal President. (Formally and generally, the presumption of innocence applies.) This communication to BMI included the written reply from June 2018 by the (Austrian) Federal President who—without taking further (compulsory) countermeasures in the sense of Art. 9a BVG and for the safety of my family, see the previously transmitted cause Sax-Teschen ("Causa Sachsen-Teschen") and the notary's report of death ("Todesfallaufnahme") for my father, established by Mag. Clemens Schmalz at Feldkirch—merely suggested an appeal to the (Austrian Federal) Administrative Court ("Bundesverwaltungsgerichthof"). This fact of being in danger of a breach of (constitutional Austrian) neutrality—together with the annexed exoneration of the inventor who has categorically refused all military (and cryptographic) offers from abroad—was—without any effect—already communicated to the former (Austrian) Federal President via fax from Switzerland in January 2016. In 2020 the case has in excerpts been reported to the International Criminal Court in Den Haag, with reference to the full documentation with Prof. Dr. Fritz Fraberger and with Mag. Clemens Schmölz respectively.

The invention claimed is:

1. A device for deriving a spatial audio signal from a Stereo input signal in a non-anechoic room, the non-anechoic room having a floor, the device comprising:

a left signal output for outputting a left output signal L, a right signal output for outputting a right output signal R, a left front loudspeaker (FL), which is connected with the left signal output, for delivering the left output signal L in the non-anechoic room, a right front loudspeaker (FR), which is connected with the right signal output for delivering the right output signal R in the non-anechoic room, a negative left amplifier, which is connected with the left signal output, for reversing polarity and reducing amplitude of the left output signal L, a backwards left loudspeaker (BtBL) on the floor, which is shifted vertically by 90° with respect to FL and which is connected with the negative left amplifier, for delivering the polarity-reversed and amplitude-reduced left output signal in the non-anechoic room, a negative right amplifier, which is connected with the right signal output, for reversing polarity and reducing amplitude of the right output signal R, a backwards right loudspeaker (BtBR) on the floor, which is shifted vertically by 90° with respect to FR which is connected with the negative right amplifier, for delivering the polarity-reversed and amplitude-reduced right output signal in the non-anechoic room, an artificial head microphone mounted in a sweet spot of FL, FR, BtBL, and BtBR in the non-anechoic room, a diameter of which has been reduced from an original natural head diameter by an average of 10%, and Δ denotes a difference between an original natural head radius and a reduced head radius, wherein an earhole of a left ear opening of the artificial head microphone is lengthened by Δ by means of a left tube that reconstructs a natural left ear distance, and wherein an earhole of a right ear opening of the artificial head microphone is lengthened by Δ by means of a right tube that reconstructs a natural right ear distance, wherein the artificial head microphone comprises:

a left omnidirectional microphone membrane that represents a natural left eardrum and is adjacent a left omnidirectional microphone having a respective impedance, the left omnidirectional microphone generates a left sound event signal L', a right omnidirectional microphone membrane that represents a natural right eardrum and is adjacent a right omnidirectional microphone having a respective impedance, the right omnidirectional microphone generates a right sound event R', a left artificial head signal output for outputting the left sound event signal L', and a right artificial head signal output for outputting the right sound event signal R'.

2. The device according to claim 1, further comprising:

a first left high-pass filter and a first left amplifier, which are interconnected for delivering an amplitude-reduced signal above a first high-pass cut-off frequency, wherein a signal input of one of the first left high-pass filter or the first left amplifier is connected with the left signal output, and wherein the other of the first left high-pass filter or the first left amplifier has a signal output which is connected with a left adder sequence, a left low-pass filter, a signal input of which is connected with the left signal output for delivery of a signal below a left low-pass cut-off frequency, wherein a signal output of the left low-pass filter is connected to the left adder sequence, a second left high-pass filter and a second left amplifier, which are interconnected for delivering an amplitude-reduced signal above a second high-pass cut-off frequency, wherein a signal input of one of the second left high-pass filter or the second left amplifier is connected with the left artificial head signal output and wherein the other of the second left high-pass filter or the second left amplifier has a signal output which is connected with the left adder sequence, wherein the left adder sequence is arranged to output a left output signal L", a first right high-pass filter and a first right amplifier, which are interconnected for delivering an amplitude-reduced signal above a first high-pass cut-off frequency, wherein a signal input of one of the first right high-pass filter or the first right amplifier is connected with the right signal output, and wherein the other of the first right high-pass filter or the first right amplifier has a signal output which is connected with a right adder sequence, a right low-pass filter, a signal input of which is connected with the right signal output for delivery of a signal below a right low-pass cut-off frequency, wherein a signal output of the right low-pass filter is connected to the right adder sequence, and a second right high-pass filter and a second right amplifier, which are interconnected for delivering an amplitude-reduced signal above a second right high-pass cut-off frequency, wherein a signal input of one of the second right high-pass filter or the second right amplifier is connected with the right artificial head signal output and wherein the other of the second right high-pass filter or the second right amplifier has a signal output which is connected with the right adder sequence, wherein the right adder sequence is arranged to output a right output signal R".

3. A device according to claim 1, further comprising:

a further negative left amplifier, which is connected to the left signal output, for reversing polarity and reducing amplitude of the left output signal L, a further backwards left loudspeaker (BL), which is connected with the further negative left amplifier, for delivering the polarity-reversed and amplitude-reduced left output signal from the further negative left amplifier in the non-anechoic room, a further negative right amplifier, which is connected to the right signal output, for reversing polarity and reducing amplitude of the right output signal R, a further backwards right loudspeaker (BR), which is connected with the further negative right amplifier, for delivering the polarity-reversed and amplitude-reduced right output signal from the further negative right amplifier in the non-anechoic room, and a further left amplifier, which is connected to the left signal output, for reducing amplitude of the left output signal L, an additional front left loudspeaker (BtFL) on the floor, which is shifted vertically by 90° with respect to FL, and is connected with the further left amplifier, for delivering the amplitude-reduced left output signal from the further left amplifier in the non-anechoic room, a further right amplifier, which is connected to the right signal output, for reducing amplitude of the right output signal R, an additional front right loudspeaker (BtFR) on the floor, which is shifted vertically by 90° with respect to FR, and is connected with the further right amplifier, for delivering the amplitude-reduced right output signal from the further right amplifier in the non-anechoic room.

4. A device for deriving a spatial audio signal from a multichannel signal in a non-anechoic room, the non-anechoic room having a floor, the device comprising:

a center signal output for outputting a center output signal, a left signal output for outputting a left output signal, a right signal output for outputting a right output signal, a left Surround signal output for outputting a left Surround signal, a right Surround signal output for outputting a right Surround signal, a center front loudspeaker (C), which is connected with the center signal output, for delivering the center output signal in the non-anechoic room, a left front loudspeaker (FL), which is connected with the left signal output, for delivering the left output signal in the non-anechoic room, a right front loudspeaker (FR), which is connected with the right signal output, for delivering the right output signal in the non-anechoic room, a left back loudspeaker (BL), which is connected with the left Surround signal output, for delivering the left Surround signal in the non-anechoic room, a right back loudspeaker (BR), which is connected with the right Surround signal output, for delivering the right Surround signal in the non-anechoic room, a first left amplifier, which is connected with the left Surround signal output, for reducing amplitude of the left Surround signal, an additional backwards left loudspeaker (BtBL) on the floor, which is shifted vertically by 90° with respect to BL, and which is connected with the first left amplifier, for delivering the amplitude-reduced left Surround signal in the non-anechoic room, a first right amplifier, which is connected with the right Surround signal output, for reducing amplitude of the right Surround signal, an additional backwards right loudspeaker (BtBR) on the floor, which is shifted vertically by 90° with respect to BR, and which is connected with the first right amplifier, for delivering the amplitude-reduced right Surround signal in the non-anechoic room, a second left amplifier, which is connected to the left signal output, for reducing amplitude of the left output signal, an additional front left loudspeaker (BtFL) on the floor, which is shifted vertically by 90° with respect to FL, and which is connected with the second left amplifier, for delivering the amplitude-reduced left output signal in the non-anechoic room, a second right amplifier, which is connected to the right signal output, for the amplitude reduction of the right output signal, an additional front right loudspeaker (BtFR) on the floor, which is shifted vertically by 90° with respect to (FR), which is connected with the second right amplifier, for delivering the amplitude-reduced right output signal in the non-anechoic room, and an artificial head microphone mounted in a sweet spot of C, FL, FR, BL, BR, BtFL, BtFR, BtBL, and BtBR in the non-anechoic room, a diameter of which has been reduced from an original natural head diameter by an average of 10%, and Δ denotes a difference between an original natural head radius and a reduced head radius, wherein an earhole of a left ear opening of the artificial head microphone is lengthened by Δ by means of a left tube that reconstructs a natural left ear distance, and wherein an earhole of a right ear opening of the artificial head microphone is lengthened by Δ by means of a right tube that reconstructs a natural right ear distance, wherein the artificial head microphone comprises:

a left omnidirectional microphone membrane that represents a natural left eardrum and is adjacent a left omnidirectional microphone having a respective impedance, the left omnidirectional microphone generates a left sound event signal L', a right omnidirectional microphone membrane that represents a natural right eardrum and is adjacent a right omnidirectional microphone having a respective impedance, the right omnidirectional microphone generates a right sound event signal R', a left artificial head signal output for outputting of the left sound event signal L', and a right artificial head signal output for outputting of the right sound event signal R'.

5. The device according to claim 4, further comprising:

a downmixer comprising:

a center amplifier, a signal input of which is connected with the center signal output for reducing amplitude of the center output signal, and a signal output of which is connected to a first left adder and a first right adder, a left amplifier, a signal input of which is connected with the left Surround signal output for reducing amplitude of the left Surround signal, and a signal output of which is interconnected with the left adder, a signal output of the left adder delivering a left downmix signal L*, and a right amplifier, a signal input of which is connected with the right Surround signal output for reducing amplitude of the right Surround signal, and a signal output of which is interconnected with the right adder a signal output of the right adder delivering a right downmix signal R*, a first left high-pass filter and a first left amplifier, which are interconnected for delivering an amplitude-reduced signal above a first left high-pass cut-off frequency, wherein a signal input of one of the first left high-pass filter or the first left amplifier is connected with the signal output of the first left adder, and the other of the first left high-pass filter or the first left amplifier has a signal output which is connected with a left adder sequence, a left low-pass filter, a signal input of which is connected with the left signal output of the first left adder, for the delivery of a signal below a left low-pass cut-off frequency, wherein a signal output of the left low-pass filter is connected to the left adder sequence, a second left high-pass filter and a second left amplifier, which are interconnected for delivering an amplitude-reduced signal above a second left high-pass cut-off frequency, wherein a signal input of one of the second left high-pass filter or the second left amplifier is connected with the left artificial head signal output and the other of the second left high-pass filter or the second left amplifier has a signal output which is connected with the left adder sequence, wherein the left adder sequence is arranged to output a left output signal L", a first right high-pass filter and a first right amplifier, which are interconnected for delivering an amplitude-reduced signal above a first right high-pass cut-off frequency, wherein a signal input of one of the first right high-pass filter or the first right amplifier is connected with the right signal output of the first right adder, and the other of the first right high-pass filter or the first left amplifier has a signal output which is connected with a right adder sequence, a right low-pass filter, a signal input of which is connected with the right signal output of the first right adder, for the delivery of a signal below a right low-pass cut-off frequency, wherein a signal output of the right low-pass filter is connected to the right adder sequence, and a second right high-pass filter and a second right amplifier, which are interconnected for delivering an amplitude-reduced signal above a second right high-pass cut-off frequency, wherein a signal input of one of the second right high-pass filter or the second right amplifier is connected with the right artificial head signal output and the other of the second right high-pass filter or the second right amplifier has a signal output which is connected with the right adder sequence, wherein the right adder sequence is arranged to output a right output signal R".

6. The device according to claim 1, further comprising:

a left equalizer for equalizing the left output signal L prior to signal delivery to the backwards left loudspeaker BtBL, and a right equalizer for equalizing the right output signal R prior to signal delivery to the backwards right loudspeaker BtBR.

7. The device according to claim 3, further comprising:

a first left equalizer for equalizing the left output signal L prior to signal delivery to the backwards left loudspeaker BL, a first right equalizer for equalizing the right output signal R prior to signal delivery to the backwards right loudspeaker BR, a second left equalizer for equalizing the left output signal L prior to signal delivery to the front left loudspeaker BtFL, a second right equalizer for equalizing the right output signal R prior to signal delivery to the front right loudspeaker BtFR.

8. The device according to claim 4, further comprising:

a left equalizer for equalizing the left output signal L prior to signal delivery to the front left loudspeaker BtFL, a right equalizer for equalizing the right output signal R prior to signal delivery to the front right loudspeaker BtFR, a left Surround equalizer for equalizing the left Surround signal LS prior to signal delivery to the backwards left loudspeaker BtBL, a right Surround equalizer for equalizing the right Surround signal RS prior to signal delivery to the backwards right loudspeaker BtBR.

9. The device according to claim 1, further comprising:

a left octave filter for filtering the left sound event signal L', and a right octave filter for filtering the right sound event signal R'.

10. The device according to claim 1, wherein, by execution of a computer program by a processor, conduct signal analysis of a first signal and a second signal, including determining chosen points on the basis of invariants of the first signal; and determining a signal analysis parameter on the basis of covariance of the chosen points of the first signal with the second signal.

11. A method for deriving a spatial audio signal from a Stereo input signal, comprising measuring or calculating HRTFs (Head Related Transfer Functions) with the device of claim 1.

12. The method according to claim 11, further comprising:

high-pass filtering and amplifying the left output signal L to generate a left amplitude-reduced signal above a first left high-pass cut-off frequency, low-pass filtering the left output signal L to generate a left signal below a left low-pass cut-off frequency, high-pass filtering and amplifying the left sound event signal L' to generate a left amplitude-reduced signal above a second left high-pass cut-off frequency, adding the left amplitude-reduced signal above the first left high-pass cut-off frequency, the left signal below the left low-pass cut-off frequency, and the left amplitude-reduced signal above the second left high-pass cut-off frequency to generate a left output signal L", high-pass filtering and amplifying the right output signal R to generate a right amplitude-reduced signal above a first right high-pass cut-off frequency, low-pass filtering the right output signal R to generate a right signal below a right low-pass cut-off frequency, high-pass filtering and amplifying the right sound event signal L' to generate a right amplitude-reduced signal above a second right high-pass cut-off frequency, adding the right amplitude-reduced signal above the first right high-pass cut-off frequency, the right signal below the right low-pass cut-off frequency, and the right amplitude-reduced signal above the second right high-pass cut-off frequency to generate a right output signal R".

13. The method according to claim 11, further comprising:

reversing a polarity of and reducing an amplitude of the left output signal L, delivering the polarity-reversed and amplitude-reduced left output signal to a further backwards left loudspeaker (BL) in the non-anechoic room, reversing a polarity of and reducing an amplitude of the right output signal R, delivering the polarity-reversed and amplitude-reduced right output signal to a further backwards right loudspeaker (BR) in the non-anechoic room, amplitude reducing the left output signal L, delivering the amplitude-reduced left output signal to an additional front left loudspeaker (BtFL) which is located on the floor in the non-anechoic room and which is shifted vertically by 90° with respect to FL, amplitude reducing the right output signal R, and delivering the amplitude-reduced right output signal to an additional front right loudspeaker (BtFR) which is located on the floor in the non-anechoic room and which is shifted vertically by 90° with respect to FR, and wherein the artificial head microphone is mounted in the sweet spot of BL, BR, BtFL, and BtFR in the non-anechoic room for measuring HRTFs of BL, BR, BtFL, and BtFR.

14. A method for deriving a spatial audio signal from a Multichannel signal, comprising measuring or calculating HRTFs (Head Related Transfer Functions) with the device of claim 4.

15. A method according to claim 14, further comprising:

downmixing the left Surround signal and the right Surround signal, including:

reducing an amplitude of the center output signal, reducing an amplitude of the left Surround output signal, and adding the reduced-amplitude center output signal and the reduced-amplitude left Surround output signal to generate a left downmix signal L*, reducing an amplitude of the right Surround output signal, and adding the reduced-amplitude center output signal and the reduced-amplitude right Surround output signal to generate a right downmix signal R*, high-pass filtering and amplifying the left downmix signal L* to generate a left amplitude-reduced signal above a first left high-pass cut-off frequency, low-pass filtering the left downmix signal L* to generate a left signal below a left low-pass cut-off frequency, high-pass filtering and amplifying the left sound event signal L' to generate a left amplitude-reduced signal above a second left high-pass cut-off frequency, adding the left amplitude-reduced signal above the first left high-pass cut-off frequency, the left signal below the left low-pass cut-off frequency, and the left amplitude-reduced signal above the second left high-pass cut-off frequency to generate a left output signal L", high-pass filtering and amplifying the right downmix signal R* to generate a right amplitude-reduced signal above a first right high-pass cut-off frequency, low-pass filtering the right signal output R* to generate a right signal below a right low-pass cut-off frequency, high-pass filtering and amplifying the right sound event signal R' to generate a right amplitude-reduced signal above a second right high-pass cut-off frequency, adding the right amplitude-reduced signal above the first right high-pass cut-off frequency, the right signal below the right low-pass cut-off frequency, and the right amplitude-reduced signal above the second right high-pass cut-off frequency to generate a right output signal R".

16. The method according to claim 11, further comprising:

equalizing the left output signal prior to signal delivery to the backwards left loudspeaker BtBL, equalizing the right output signal prior to signal delivery to the backwards right loudspeaker BtBR.

17. The method according to claim 13, further comprising:

equalizing the left output signal prior to signal delivery to the backwards left loudspeaker BL, equalizing the right output signal prior to signal delivery to the backwards right loudspeaker BR, equalizing the left output signal prior to signal delivery to the front left loudspeaker BtFL, equalizing the right output signal prior to signal delivery to the front right loudspeaker BtFR.

18. The method according to claim 14, further comprising:

equalizing the left output signal prior to signal delivery to the front left loudspeaker BtFL, equalizing the right output signal prior to signal delivery to the front right loudspeaker BtFR, equalizing the left Surround signal prior to signal delivery to the backwards left loudspeaker BtBL, equalizing the right Surround signal prior to signal delivery to the backwards right loudspeaker BtBR.

19. The method according to claim 11, further comprising:

filtering of the left sound event signal L' with a left octave filter, filtering of the right sound event signal R' with a right octave filter.

20. The method according to claim 11, further comprising executing a computer program with a processor to conduct signal analysis of a first signal and a second signal, including determining chosen points on the basis of invariants of the first signal; and determining a signal analysis parameter on the basis of covariance of the chosen points of the first signal with the second signal.

* * * * *